Patented Sept. 9, 1941

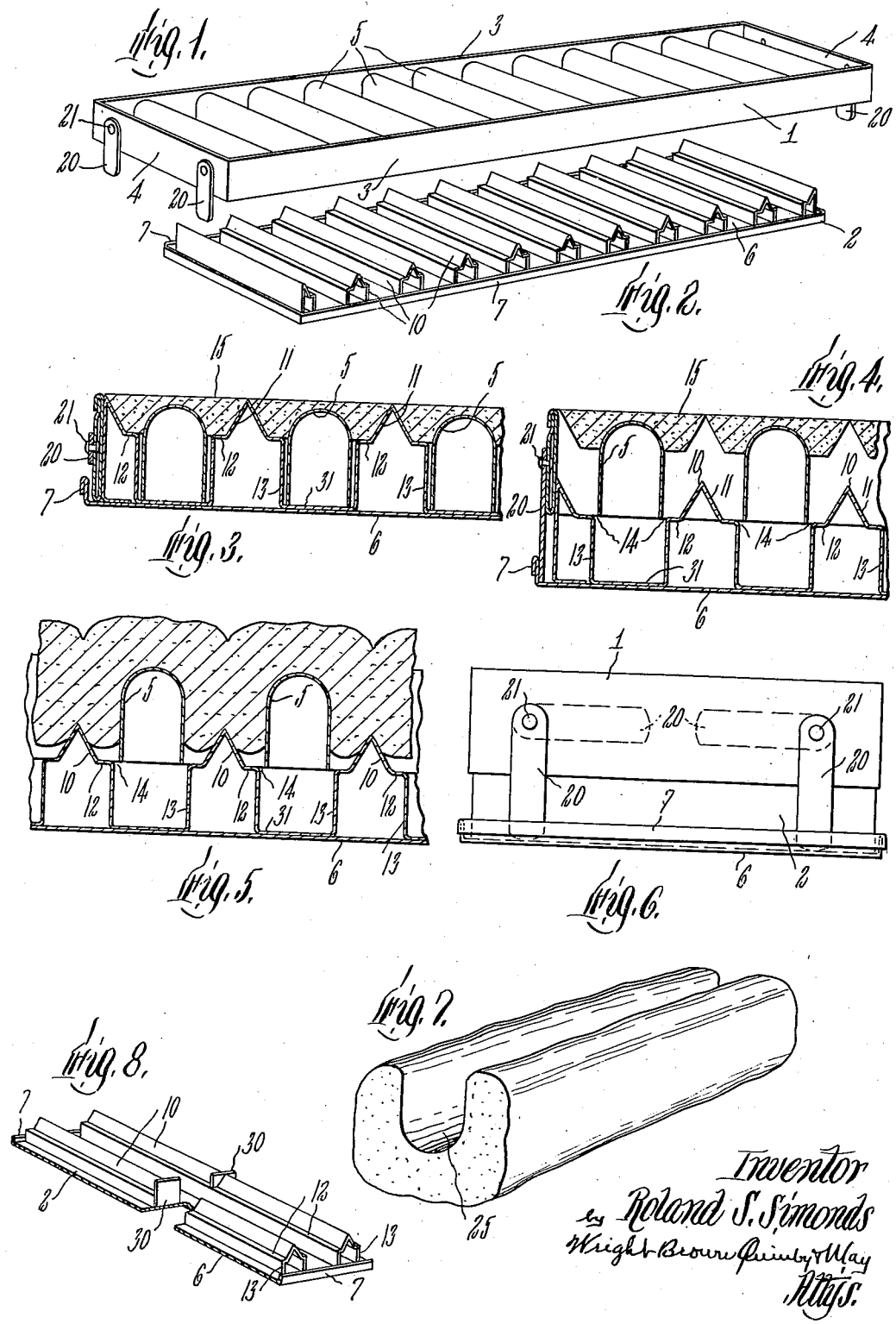

2,255,089

UNITED STATES PATENT OFFICE 2,255,089

PAN FOR BAKING ROLLS

Roland S. Simonds, Manchester, N. H.

Application June 2, 1939, Serial No. 277,051

10 Claims. (Cl. 53—6)

In preparing rolls for salads, frankforts, and the like, it is usual practice to take an elongated baked roll and cut inwardly lengthwise along one side. The roll is then opened up along the cut, and there is inserted therein the salad, frankfort, or other filling. This results in an article difficult to hold in the hand and from which the contents are likely to be spilled. If the roll is cut in too far, it is likely to break in two, so that it can no longer retain its contents. It also presents the cut surface of the roll to the contents and as these are commonly moist, and in the case of a frankfort, steamy, the surrounding portions of the roll may be rendered soggy and unpalatable.

An object of the present invention, therefore, is to provide a pan adapted to bake a roll provided with an open top channel deep enough not only to contain the frankfort but also to contain any condiments served on the top of it, all of which will be contained within the channel below the top of the roll.

It is also an object of this invention to provide a pan which will produce a somewhat crusted or glazed surface for the channel, which will prevent an undesirable softening of the roll, resulting in sogginess from the moisture of the filling.

A further object is to provide a pan in which the exact required amount of dough is measured directly in the pan and therefore is always the same, and the exact amount required, so that no transfer of dough from a measuring device to the baking pan is required. By this means, the proper loading of the pan is rendered quick and easy, so that quantity production is readily obtained with the minimum of labor.

Further objects and advantages will appear from a more complete description of embodiments of the invention shown in the accompanying drawing, in which Figures 1 and 2 are perspective views of the top and bottom pan portions, respectively, of a single pan.

Figure 3 is a fragmentary longitudinal vertical section through the pan portions of Figures 1 and 2 arranged for receiving the dough and shown as filled with the dough.

Figure 4 is a view similar to Figure 3, but showing the pan parts adjusted for raising and baking.

Figure 5 is a view similar to a portion of Figure 4, but showing the conditions of baking.

Figure 6 is a fragmentary end elevation of the pan sections in the positions of Figures 4 and 5.

Figure 7 is a perspective view of the individual roll.

Figure 8 is a fragmentary perspective of the bottom section of a double pan.

Referring to the drawing, the pan for measuring the dough and baking the rolls comprises an upper portion 1 and a lower portion 2. The upper portion 1 comprises opposed side walls 3 and end walls 4 with their top and bottom edges flush. Between opposite walls, herein shown as the side walls 3, are arranged a plurality of U shaped hollow sheet metal fingers 5, the tops of which are slightly below the upper edges of the side and end walls 3 and 4. As shown best in Figures 4 and 5 these fingers are open beneath.

The lower portion 2 comprises a base 6, preferably having low marginal upstanding walls 7. Upstanding from the base 2 are tubular elements 10 open at their ends. Each of these elements 10 comprises, as shown, a V-shaped hollow partition 11, beneath which and extending toward the sides of the fingers 5, when the pan portions are assembled as shown in Figures 3, 4 and 5, are baffles 12 which extend toward the adjacent finger 5, but are out of contact therewith. At the outer edges of the baffle portions 12 are the side wall supports 13 which support the partitions and the baffles elevated from the base 6. Since at the end walls 4 there is only one finger, the tubular portions 10 are half portions comprising only one side of the partition 11 and one baffle 12.

The upper and lower portions 1 and 2 are first assembled as shown in Figure 3 with the side and end walls 3 and 4 of the upper section resting directly on the base 2. In this position of the parts the tops of the partitions 11 are flush with the tops of the side and end walls 3 and 4 and the tops of the transverse fingers 5 are slightly below these edges. The parts thus form relatively shallow receptacles which become filled with the dough 15 as it is rolled out from a single mass of dough placed on top of the fingers 5. The outer edges 3 and 4, together with the top edges 11, act as cutting edges which automatically cut out the individual rolls as the dough is rolled out, the surplus dough falling over the edges 3 and 4. Each of these shallow receptacles is of sufficient capacity to hold the amount of dough suitable for an individual roll. The dough having been thus placed in the pan, the upper section is lifted and is supported upon leg members 20 which may be loosely pivoted as at 21 to the end walls 4, so that when turned down they may engage the base 6 within the margin 7 as shown in Figures 3 and 4. In this position of the parts the partitions 11 are considerably below the upper edges of the side and end walls 3 and 4 of the upper section and the baffles 12 are substantially opposite to the lower edges of the fingers 5, so that the dough which was measured out into each of the shallow receptacles of Figure 3 is now provided with considerable space in which to expand when it is set to raise. At the same time the fingers 5 support the dough as shown in Figure 4.

The dough when rising expands both upwardly and downwardly and when in baking condition is substantially in the condition shown in Figure 5, having descended sufficiently to come part way down on the partitions 11 which partially divide the rolls lengthwise, but insufficient to engage the baffles 12. The dough is then in condition to be baked and results in the formation of a sheet of rolls connected together along their side edges as shown in Figure 5, but readily broken apart when this is desired. The tubular members 10 being open at their ends, permits circulation of the hot air from the oven through these portions, and the hot air entering the spaces 14 between the fingers 5 and the baffles 12 results in crusting over the lower edges of the rolls, which, of course, become the upper edges during use as shown in Figure 7. The baffles 12 prevent the full heat of the oven from ready access to the relatively narrow portions extending between the fingers 5 or between the fingers 5 and the end walls 4 and thus tend to equalize the amount of crusting between these portions and the top of the dough layer, which becomes the bottom of the completed rolls, the rolls being thus formed and baked bottom side up. The spaces 14 permit the escape of steam during the baking operation, which if not permitted would tend to make these edges soggy. The access of the hot oven atmosphere to the inside of the fingers 5 results in a slight crusting of the interior of the channel 25 which forms a sufficient glaze on the interior of this channel so that the roll does not become soggy by contact with the moisture of the contents such as a salad or the steaming effect of the hot frankfort. The side edges of the completed roll are not crisped, but as before mentioned, are so loosely bonded with the adjacent rolls that they can be readily broken apart when desired, this condition having been produced by the initial separation of the dough when the pan was first loaded in the position of Figure 3.

The pan portions of Figures 1 and 2 may be of sufficient length to accommodate a dozen rolls. In many cases it may be desired to use a double pan having twice the width of the single pan. When this is done, both the upper section 1 and the lower section 2 are widened to double the single width and the lower section 2 furnished at the center with sections of transverse cutting members 30 set into the tubular members 10, extending the full width and height and flush with the top of the partitions 11. When the two sections are assembled for loading, these partitions 30 divide each roll in half longitudinally, so that the rolls may be readily separated after baking into the desired standard lengths. In like manner the pan may be extended both in length and width, or in one direction only, to increase the capacity of each individual pan.

The tubular members 10 may be readily formed from a single sheet metal piece which may be died out into undulating contour to form tubular portions with integral connecting bases 31, as shown in Figures 4 and 5. These bases may then be spot welded or otherwise secured to the base portion 6 of the lower section. The end walls 4 of the upper section may be formed double, as shown in Figure 4, so that rivets or other suitable pivoting means at 21 may secure the leg members 20 without leaving exposed rivet heads on the inner face of these wall members.

From the foregoing description of certain embodiments of the pan, and the rolls which may be baked therein, it should be evident to those skilled in the art that various other changes and modifications might be made therein without departing from the spirit or scope of this invention as defined by the appended claims.

I claim:

1. A roll baking pan in baking condition having a series of hollow fingers open beneath and over which the dough may be placed, dividing partitions extending upwardly between adjacent fingers and terminating below the tops of said fingers, and baffles between said partitions and said fingers partly closing the space therebetween.

2. A roll baking pan in baking condition having a series of hollow fingers open beneath and over which the dough may be placed, dividing partitions extending upwardly between adjacent fingers and terminating below the tops of said fingers, baffles between said partitions and said fingers partly closing the space therebetween, and means supporting said fingers and baffles in elevated position.

3. A roll baking pan having upper and lower telescopically related portions, said upper portion comprising side and end walls and hollow fingers extending between opposite of said walls and open beneath, said lower portion comprising a base, partitions carried by said base in position to project between the fingers of said upper portion when said portions are assembled, and baffles extending laterally from said partitions toward said fingers, and means for supporting said upper portion in either selected of two positions with respect to said lower portion in the lower of which positions said partitions extend substantially even with the top edges of said side and end walls and define therewith and with said baffles and fingers relatively shallow compartments measuring the correct amount of dough for the pan, and in the other of which positions said partitions and baffles are in lowered position and help to define spaces for downward expansion of the dough as it rises.

4. A roll baking pan having upper and lower portions, said upper portion comprising side and end walls and inverted U shaped fingers extending in spaced relation between opposite of said walls and with their closed tops below the upper edges of said walls, said lower portion comprising a base and upwardly projecting tubular members open at their ends and each comprising a hollow upwardly tapering partition and a baffle portion extending from the base of said partition toward a finger of said upper portion when said portions are assembled, the tops of said partitions extending substantially flush with the top edges of said walls when said upper portion is supported in a lower position relative to said lower portion in which position said upper and lower portions form a relatively shallow receptacle to receive the correct amount of dough, and means for supporting said upper portion in an elevated position with respect to said lower portion.

5. A roll baking pan having upper and lower portions, said upper portion comprising side and end walls and inverted U shaped fingers extending in spaced relation between opposite of said walls and with their closed tops below the upper edges of said walls, said lower portion comprising a base and upwardly projecting tubular members open at their ends and each comprising a hollow upwardly tapering partition and a baffle portion extending from the base of said partition toward a finger of said upper portion when said portions are assembled, the tops of said partitions extending substantially flush with the top edges of said walls when said upper portion is supported in a lower position relative to said lower portion in which position said upper and lower portions form a relatively shallow receptacle to receive the correct amount of dough, and a plurality of leg members pivoted to certain of said walls and adapted when in upright position to support said upper portion from said base in an elevated position to allow for downward expansion of the dough as it rises.

6. A roll baking pan having upper and lower portions, said upper portion comprising side and end walls and inverted U shaped fingers extending in spaced relation between opposite of said walls and with their closed tops below the upper edges of said walls, said lower portion comprising a base and upwardly projecting tubular members open at their ends and each comprising a hollow upwardly tapering partition and a baffle portion extending from the base of said partition toward a finger of said upper portion when said portions are assembled, the tops of said partitions extending substantially flush with the top edges of said walls when said upper portion is supported in a lower position relative to said lower portion in which position said upper and lower portions form a relatively shallow receptacle to receive the correct amount of dough, dividing wall members supported from said base and bridging said tubular members and extending substantially flush with the top edges of said walls when said upper portion is lowered, and means for supporting said upper portion in an elevated position with respect to said lower portion.

7. A baking pan having a receptacle provided with spaced interior supports extending above its base for supporting a piece of dough with capability of upward expansion and downward expansion around said support as the dough rises, and partition members extending upwardly from said base into the spaces between said supports.

8. A baking pan having a receptacle provided with an interior support extending above its base for supporting a piece of dough with capability of upward expansion and downward expansion around said support as the dough rises, said base being open for at least a portion of its area.

9. A roll baking pan having a receptacle provided with spaced internal supports extending thereacross above its base for supporting a piece of dough for expansion upwardly and for expansion downwardly on opposite sides of said supports as the dough rises, said supports being hollow and open on their lower sides.

10. A roll baking pan having a receptacle provided with an internal support extending thereacross above its base for supporting a piece of dough for expansion upwardly and for expansion downwardly on opposite sides of said support as the dough rises, said base being open for at least a portion of its area.

ROLAND S. SIMONDS.